United States Patent [19]

Wang

[11] Patent Number: 4,953,281

[45] Date of Patent: Sep. 4, 1990

[54] METHOD OF MAKING A STAPLE REMOVER

[76] Inventor: Yun L. Wang, 424 Barrenwood Dr., Wadsworth, Ohio 44281

[21] Appl. No.: 354,455

[22] Filed: May 19, 1989

Related U.S. Application Data

[62] Division of Ser. No. 7/173,267, Mar. 25, 1988, Pat. No. 4,903,945.

[51] Int. Cl.[5] .............................................. B23P 11/00

[52] U.S. Cl. .......................................... 29/438; 29/469

[58] Field of Search ........................ 254/22, 28, 23, 21; 227/63; 29/438, 463, 469

[56] References Cited

U.S. PATENT DOCUMENTS 2,553,660 5/1951 Levendusky .......................... 254/28

2,662,727 12/1953 Yerkes .................................. 254/28

4,674,727 6/1987 McAlister ............................ 254/28

*Primary Examiner*—Mark Rosenbaum

*Assistant Examiner*—Frances Chin

*Attorney, Agent, or Firm*—Oldham & Oldham Co.

[57] ABSTRACT

A staple remover is provided comprising two levers pivotally coupled at one end and being movable towards one another at their other ends. A pair of extraction jaws are formed at the movable ends of the levers for engaging the underside of a staple embedded in a material to thereby lift the staple away from the material. The staple remover also comprising an engaging member located adjacent the extraction jaw in one of the levers and forming a slot with said extraction jaw. The engaging member will engage the upper surface of the staple to thereby anchor the staple at a middle portion thereof for clean and uniform withdrawal of the staple ends from the paper.

11 Claims, 2 Drawing Sheets

FIG.-1
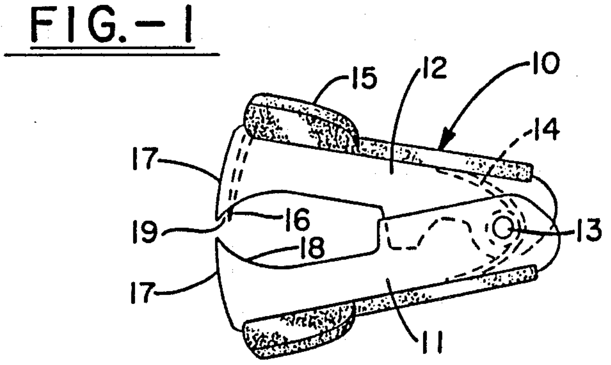
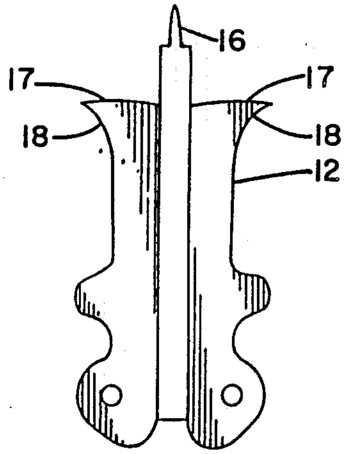
FIG.-3
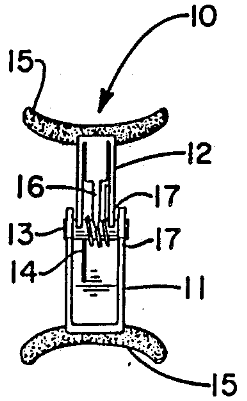
FIG.-2
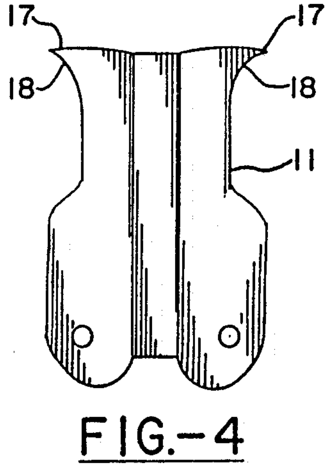
FIG.-4
FIG.8a
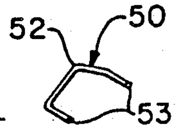
FIG.8b
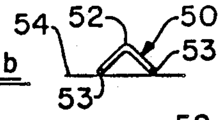
FIG.8c
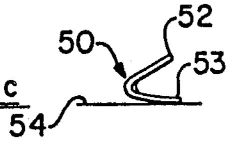

METHOD OF MAKING A STAPLE REMOVER

This is a divisional of copending application(s) Ser. No. 07/173,267 filed on Mar. 25, 1988, now U.S. Pat. No. 4,903,945.

BACKGROUND OF THE INVENTION

The invention relates to a staple remover suitable for extracting or withdrawing staples or similar fasteners from articles or bundles held together thereby. More particularly, the present invention relates to a staple extracting device which will accomplish removal of the staple without causing damage to the materials held together thereby, and will uniformly withdraw the staple ends.

The staples are utilized to secure materials together, such as paper, in such a manner that they are not easily detachable from each other. Frequently, it is desired to remove the staple so that the materials may be disengaged and separated. One such device which has been utilized in the prior art to remove staples, comprises a pair of levers connected at one end thereof and spring biased such that the levers are held in an open position with their opposite ends away from one another. The levers of the staple remover have at their other ends, engaging jaws, each having two projecting points facing the opposite lever. The points of each jaw are tapered away from these points creating a surface on which the staples will ride upon during removal. The points of each jaw are designed to overlap each other when the levers are brought together by a force applied thereto. In this way, the jaws may be positioned on opposite sides of a staple secured to a bundle of papers, and be made to engage the staple with these points. As the levers are brought together, the jaws will engage the underside of the staple which will be forced to ride up the tapered surfaces. As the staple rides up the tapered surfaces of the jaws, the ends thereof will be unbent from their secured position to thereby be removed from the paper bundle.

With such an apparatus, problems have been encountered in that the removal of a staple creates enlarged openings in the paper or other material and many times tears and damages the paper undesirably. Another drawback of such an apparatus is that very often one end of the embedded staple remains secured to the paper bundle making removal thereof very difficult and frustrating. These problems are due to the application of unequal forces to the two embedded sides of the staple. The forces applied by the apparatus may be unequal at times because of disproportionate resistance to unbending of the clinching staple ends or sometimes because of initial misalignment of the jaw engagement with the staple. The ends of the staple are therefore not always unbent uniformly and completely, and thus, tearing of the openings from the extraction of staple ends which are only partially straightened or incomplete extraction of the staple with a partially straightened end occurs.

It has, therefore, been found that a more effective staple remover is desirable which avoids the problems mentioned, and yet is simple in design and particularly easy to manufacture.

SUMMARY OF THE INVENTION

It is an object of the present invention to provide a staple remover having an engaging portion which will make contact with the middle portion of the staple in its embedded position to thereby assuredly remove a staple by the uniform and complete straightening of both staple ends. The engaging portion will make contact with the staple approximately simultaneously with the extracting jaws of the apparatus, and acts to anchor the middle portion of the staple for uniform straightening of the ends.

It is another object of the present invention to provide a mechanism whereby extraction of the staple from a paper bundle may be accomplished without enlarging or tearing the holes that were made by the staple initially.

It is also an object of the present invention to provide a device which will uniformly withdraw both legs of a staple simultaneously during extraction.

It is another object of the present invention to provide a device which will cause a staple to take on a non-planar configuration during extraction thereof. Such a non-planar configuration facilitates easy grasping of an extracted staple from a desk surface for disposal.

It is an additional object of the present invention to provide a method of manufacturing a staple extraction apparatus which does not require any additional steps to provide the advantages thereof, and which may be constructed in a simple and efficient manner.

The objects and advantages of the present invention are obtained by a staple extraction device comprising a first and second lever typically coupled at one end and having an extraction jaw at their opposite ends. The extraction jaw comprises a pair of points formed on each lever which extends towards the opposite lever and are engagable with the staple embedded in a bundle of papers or the like. The points of the extraction jaws taper back therefrom to each of the respective levers forming a surface upon which the staple once engaged will ride up and be extracted from the paper bundle.

The apparatus also comprises an engaging member located between the points of one extraction jaw and is extended toward the opposite lever adjacent the jaw points. The engaging member, which is generally shaped like a pin, is disposed above the bottom edge of the jaw and will engage the top side of the the staple substantially simultaneously to the engagement of the points of the extraction jaws to the underside of the staple. The engaging member acts to anchor the middle portion of the staple for proper application of force by the extracting jaws to thereby remove the staple legs neatly and uniformly from the paper bundle. The extraction device may be constructed of stamped metal members typically coupled at one end thereof and having the extraction jaws thereof spring biased to an open position. Alternatively, it may be constructed or and integrally formed resilient plastics spring and levers to which extraction jaws may be attached.

BRIEF DESCRIPTION OF THE DRAWING

The objects and advantages of the present invention may be more fully appreciated with reference to the description of the preferred embodiments and drawings wherein:

FIG. 1 is a side view of the extraction device of the present invention;

FIG. 2 is a bottom view of the apparatus showing the extraction jaws and engaging member thereof;

FIGS. 3 and 4 are plan views of the stamped metal pieces forming the extraction jaws of the present invention;

FIGS. 8 (*a*)–(*c*) show views of an extracted staple using the apparatus of the present invention.

It is understood that like reference characters refer to like elements throughout the several figures.

DETAILED DESCRIPTION OF THE INVENTION

Figure 5:
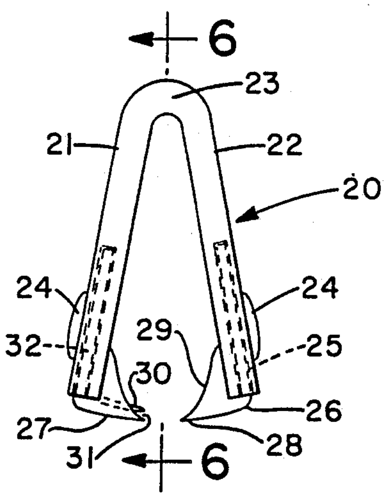
FIG. 5 is a side view of an alternate embodiment of the present invention.

The preferred embodiments of the present invention will be hereinafter described with reference to the figures. In FIG. 1, there is shown one embodiment of the present invention wherein the extraction device is shown generally by reference numeral 10. The device 10 comprises two levers, 11 and 12, pivotally connected at one end by means of a pin 13 extending through apertures therein. The levers 11 and 12 are shown in an open position, and being spring biased in this position by spring means 14. The levers 11 and 12 are, therefore, able to pivot toward one another at the opposite end of coupling. The levers 11 and 12 are provided with thumb or finger rests 15 such that a force may be applied with a user's hand to pivot the levers 11 and 12.

At the opposite end from coupling on the levers 11 and 12, are provided extraction jaws 17 having a pair of respective points thereon for engaging a staple which is embedded in a paper bundle or the like. This structure is seen more clearly with reference to FIG. 2, wherein the extraction jaws 17 are more clearly shown with a pair of points formed on each respective jaw. The jaws 17 enable engagement with the head of a staple which is embedded in a paper bundle for extraction. The extraction jaws 17 provide a tapering surface 18 upon which the engaged staple will ride up when the levers 11 and 12 are pivoted towards one another, thereby extracting the embedded staple.

The description of the apparatus in FIG. 1 has been, until now, a standard construction for a staple remover as found in the prior art. In this invention is provided a separate engaging member 16 which facilitates removal of an embedded staple. As can be seen in FIG. 1, the engaging member 16 is positioned above and parallel to the lower edge of extraction jaw 17 on the lever 12. In this way, the engaging member 16 will not inhibit engagement of the points on extraction jaw 17 with the underside of the embedded staple. The engaging member 16 extends out between the points of extraction jaws 17, and projects to the same extent as the points. The end of the engaging member 16 and the two points of the extraction jaw 17 form a small gap or slot 19 as seen in FIG. 1. The slot 19 is of a suitable dimension such that the thickness of a staple wire will be accommodated therein, and will be wedged or anchored within the slot 19 upon initial engagement with the apparatus. The operation of the apparatus will be described more fully hereinafter, but it is to be said that the engaging member 16 facilitates proper removal of a staple embedded in a bundle of material by assuring the uniform and complete straightening of the staple ends during extraction.

It is seen with reference to FIG. 3, that the engaging member 16 is integrally constructed with the lever 12 from a stamped piece of metal which will be bent into the proper shape. The levers 11 and 12 are shown in FIGS. 3 and 4 as being stamped from a flat piece of metal, and formed with extracting jaw 17 having a pair of spaced apart oppositely positioned angular projections or points and tapering surfaces 18 thereon. The addition of a third projection or engaging member 16 adds no significant additional steps to the presently known manufacturing steps of such a device. The member 16 is simply stamped in conjunction with the lever 12 and is then bent into its position between and adjacent the points of extracting jaw 17. The lever 11 is constructed similarly to that of a presently known device, and comprises the extracting jaw 17 and tapered surfaces 18 which will be bent into their U-shaped position as shown in FIG. 2. The engaging member 16 may be incorporated in either lever, as desired, and will function in the same manner as described.

Figure 7:
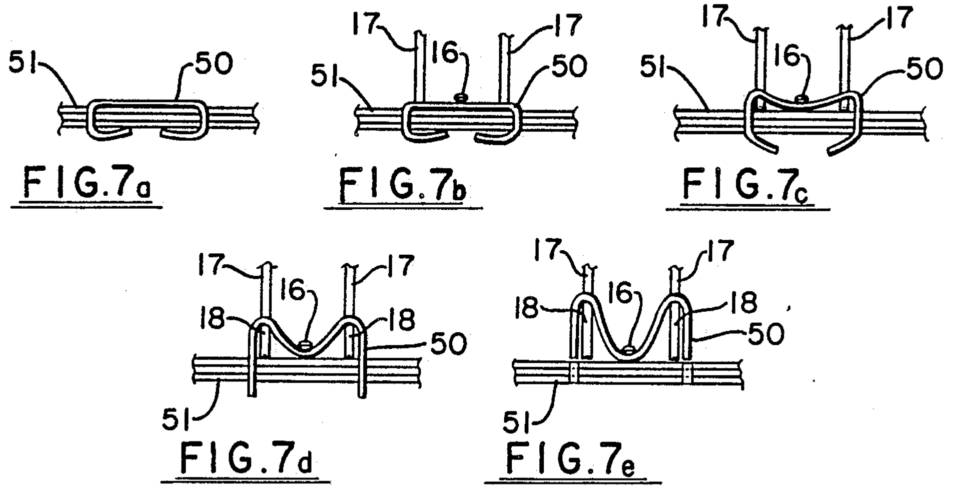
FIGS. 7 (*a*)–(*e*) show the sequence of staple extraction using the embodiments of the present invention.

The operation of the device as shown in FIG. 1 is now described with reference to FIG. 7 showing different stages of operation to extract a staple 50 embedded in a paper bundle 51 or the like as shown in FIG. 7(*a*). The extraction jaws 17 associated with the lever 12 of FIG. 1 is shown in FIG. 7(*b*) and it is to be understood that the opposite lever 11 (not shown) will be engaging the staple 50 from the other side thereof for extraction of the staple. Engaging member 16 is shown as engaging the top portion of the staple 50 at a location near the middle thereof. The engaging member 16 may engage the staple 50 either simultaneously with or immediately after engagement of the points on extraction jaw 17 with the underside of staple 50. As shown in FIG. 7(*c*), the engaging member 16 will act to anchor the center of the staple 50 against the paper bundle 51 while the points of extraction jaw 17 lift the edges of the staple away from the paper. As the levers 11 and 12 are brought together, the staple 50 will be made to ride up the tapered surface 18 thereby straightening the ends and extracting the staple cleanly from the paper bundle 51 as shown in FIG. 7(*d*). The engaging member 16 still retains the middle portion of staple 50 anchored at a location near the paper in the formed slot 19 as shown in FIG. 1. By the anchoring operation of engaging member 16, the two staple legs are straightened independently and completely such that they are uniformly withdrawn from the paper bundle 51. The engaging member 16 will ensure that the force or straightening action applied to each of the staple legs is identical so that there is no possibility of a staple leg being retained in the paper bundle 51. It can be seen that the complete straightening of the legs on staple 50 by the action of engaging member 16 facilitates uniform withdrawal of the legs and proper removal of the staple without damaging or tearing the paper 51.

As the levers 11 and 12 are continually forced together, the staple 50 will be completely removed from the paper bundle 51 and is bent into a position as shown in FIG. 7(*e*) wherein the legs of the staple 50 will be drawn back from the gap 19 between the tapered surface 18 of the extraction jaw 17 and engaging member 16. In this way, the staple will have a raised portion at the middle thereof after removal from the paper bundle 51 to facilitate easy grasping for disposal thereof. This can be seen more particularly with reference to FIGS. 8(*a*)–(*c*). In FIG. 8(*a*), the resulting shape of an extracted staple using the present invention is shown in perspective. In FIGS. 8(*b*) and (*c*), it can be seen that the staple 50 has a portion 52 which extends upwardly from legs 53. The legs 53 will be flat on a planar surface 54 such that portion 52 projects away from the surface 54 facilitating easy grasping of the removed staple. It can be seen with reference to the operation of the extracting device, that the legs of the staple 50 are removed cleanly and uniformly from a paper bundle by means of engaging member 16.

Figure 6:
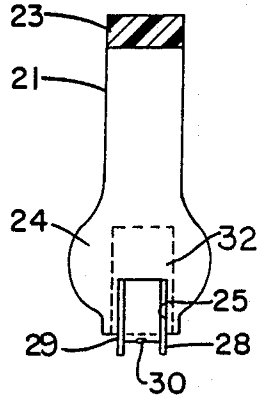
FIG. 6 is a cross-sectional view taken along the line 6—6 of FIG. 5.

A second embodiment of the invention is shown with reference to FIGS. 5 and 6 wherein the extraction device is generally shown by reference numeral 20. The device 20 again comprises two levers 21 and 22 which are able to pivot towards one another from an initial open position. The levers 21 and 22 are formed integrally with a curved portion 23 providing the bias force necessary to keep the device in an initially opened position. The levers 21 and 22 and curved portion 23 are made of a resilient plastics material which will enable pivoting of the levers 21 and 22 towards one another and will then spring back to its original shape and open position. The use of such a plastics material obviates the need for separate levers which are coupled by means of a pin as shown in FIG. 1. The levers 21 and 22 may also be integrally formed with a thumb or finger rest 24 therein similarly to that shown in FIG. 1, but not requiring any fastening means. The device 20 may be formed by molding the plastics material, and also comprises a pair of slots 25 formed in the ends of levers 21 and 22. The slots 25 are produced to enable engagement with separate extracting jaw members 26 and 27. The extracting jaws 26 and 27 are formed similarly to that shown in FIG. 1 with points 28 having tapering surfaces 29 therefrom. As seen with reference to FIG. 7, the extracting jaws may be provided with a plate portion 32 which fits into the slotted portion 25 of the levers 21 and 22 to frictionally retain the extracting jaws therein. This structure eliminates the need for additional fastening means, but the extracting jaws 26 and 27 may be fastened to the levers 21 and 22 by any suitable fastening means if desired. A separate engaging member 30 is provided which extends between the points of extracting jaw 27 similarly to member 16 of FIG. 1.

It can be seen that the present invention improves the function of a staple removing device such that the staple may be easily removed without damaging or tearing the paper in which it is embedded, and it will extract the legs of a staple uniformly so that the staple is assuredly removed from the paper. It is seen that with the separate engaging member, as shown in the embodiments of the present invention, the objects and advantages of the present invention are realized in a very cost effective and easily manufactured method to provide an improved structure. While the preferred embodiments of the present invention have been disclosed herein, it will be appreciated that modification of these particular embodiments of the invention may be resorted to without departing from the scope of the invention as found in the appended claims.

I claim:

1. A method of manufacturing a staple removing device comprising the steps of;

forming a pair of extraction means in a first plane to be provided on first and second levers respectively;

each of said extraction means having a spaced apart oppositely positioned pair of points at one end of said extraction means, and one of said pair of extraction means having a projection forming an engaging member located intermediately between said points and formed integrally therewith;

bending said extraction means on said first and second levers such that said points will extend in a plane substantially perpendicular to said first plane;

bending said engaging member such that it is disposed intermediately between said points of one of said bent extraction means and forms an engaging gap with both of said extraction points thereof;

pivotally coupling said levers at one end thereof with said extraction means provided thereon such that said extraction means are movable toward each other whereby said staple will be engaged by said gap and the points of the other of said extraction means to thereby uniformly remove the ends of said staple by said extraction means.

2. A method of manufacturing a staple removing device as in claim 1, wherein;

said levers are constructed of a resilient plastics material coupled with an integrally formed bias means; and said levers are formed to accommodate said extraction means, which are attachable thereto.

3. A method of manufacturing a staple removing device as in claim 2, wherein;

said levers have a slot formed therein to engage and frictionally retain said extraction means.

4. A method of manufacturing a staple removing device as in claim 1, wherein;

said extraction means and said levers are integrally formed and are stamped from a piece of metal.

5. A method of manufacturing a staple removing device as in claim 1, wherein;

said bending steps are carried out simultaneously such that said points and said engaging member of said one of said extraction means are formed into their final operative positions in one manufacturing step.

6. A method of manufacturing a staple extraction means, comprising the steps of:

forming a pair of extraction means from a flat sheet of material having two spaced apart angular projections or points in said flat sheet at one end thereof;

one member of said pair also having formed therein a third projection formed between and intermediate to said spaced apart angular projections;

bending said spaced apart angular projections along with said third projection of said one member perpendicularly to said flat sheet whereby said third projection will form a gap with said angular projections in which a staple having ends to be extracted will lodge such that upon engagement of said angular projections and said third projection, the ends of said staple will be uniformly straightened and removed during extraction by said extraction means.

7. A method of manufacturing a staple extraction means as in claim 6, wherein;

said extraction means are stamped from a sheet of metal.

8. A method of manufacturing a staple extraction means as in claim 6, wherein;

said extraction means are fastened together at the ends opposite said angular projections so as to pivot toward one another for extraction of an embedded staple.

9. A method of manufacturing a staple extraction means as in claim 6, wherein;

said extraction means are fastened with a pair of levers so as to pivot toward one another for extraction of an embedded staple.

10. A method of manufacturing a staple extraction means, comprising the steps of;

forming a pair of extraction means from a flat sheet of material having two spaced apart angular projections or points at one end thereof, said spaced apart angular projections are bent upwardly towards one another to lie in spaced apart parallel relationship;

one member of said pair also having formed therein a third projection between said spaced apart angular projections, said third projection of said one member being bent upwardly to lie in a plane perpendicular to said parallel projections;

bending said spaced apart angular projections along with said third projections of said one member perpendicularly to said flat sheet whereby said third projection will form a gap with said angular projections in which a staple having ends to be extracted will lodge such that upon engagement of said angular projections and said third projection, the ends of said staple will be uniformly straightened and removed during extraction by said extraction means.

11. A method of manufacturing a staple extraction means comprising the steps of;

forming a pair of extraction means from a flat sheet of material having two spaced apart angular projections or points at one end thereof;

one member of said pair also having formed therein a third projection between said spaced apart angular projections;

bending said spaced apart angular projections along with said third projections of said one member perpendicularly to said flat sheet whereby said third projection will form a gap with said angular projections in which a staple having ends to be extracted will lodge, wherein said third projection extends outwardly from said plane perpendicular to said flat sheet when said extraction means are formed and includes notches on either side thereof such that during said bending step said third projection will be bent to a spaced apart position relative to said plane containing said angular projections to form said gap, such that upon engagement of said angular projections and said third projection the ends of said staple will be uniformly straightened and removed during extraction by said extraction means.

* * * * *